(12) United States Patent
Dantressangle et al.

(10) Patent No.: US 9,984,124 B2
(45) Date of Patent: May 29, 2018

(54) DATA MANAGEMENT IN RELATIONAL DATABASES

(75) Inventors: Patrick Dantressangle, Hampshire (GB); Eberhard Hechler, Sindelfingen (DE); Martin Oberhofer, Bondorf (DE); Michael Wurst, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 758 days.

(21) Appl. No.: 13/443,964

(22) Filed: Apr. 11, 2012

(65) Prior Publication Data

US 2012/0290608 A1 Nov. 15, 2012

(30) Foreign Application Priority Data

May 11, 2011 (EP) .................................... 11165740

(51) Int. Cl.
*G06F 7/00* (2006.01)
*G06F 17/30* (2006.01)

(52) U.S. Cl.
CPC .............................. *G06F 17/30501* (2013.01)

(58) Field of Classification Search
CPC ......... G06F 17/30389; G06F 17/30595; G06F 17/30501
USPC ........................................ 707/713, 769, 796
See application file for complete search history.

(56) References Cited

U.S. PATENT DOCUMENTS

| 5,301,231 | A  | * | 4/1994  | Abraham et al. ............. 713/191 |
| 6,421,665 | B1 |   | 7/2002  | Brye et al. |
| 6,553,366 | B1 |   | 4/2003  | Miller et al. |
| 6,687,695 | B1 |   | 2/2004  | Miller et al. |
| 6,745,173 | B1 | * | 6/2004  | Amundsen ........ G06F 17/30324 |
| 6,745,384 | B1 | * | 6/2004  | Biggerstaff ........... G06F 8/4441 |
|           |    |   |         | 712/203 |
| 7,181,449 | B2 |   | 2/2007  | Ramsey et al. |
| 7,734,652 | B2 |   | 6/2010  | Tamayo et al. |
| 2007/0130116 | A1 |   | 6/2007  | Cras et al. |
| 2008/0104089 | A1 | * | 5/2008  | Pragada et al. ............... 707/100 |
| 2009/0307673 | A1 | * | 12/2009 | Eichenberger et al. ...... 717/160 |
| 2011/0185265 | A1 | * | 7/2011  | Cherukuri ........... H03M 13/152 |
|           |    |   |         | 714/782 |

OTHER PUBLICATIONS

C. Ordonez and J. Garcia-Garcia. Vector and matrix operations programmed with UDFs in a relational DBMS. In ACM CIKM Conference, 2006.*
M. Stonebraker, et al., One Size Fits All?—Part 2: Benchmarking Results, 3rd Biennial Conference on Innovative Data Systems Research (CIDR) Jan. 7-10, 2007, Asilomar, California, 12 pages.

(Continued)

*Primary Examiner* — Boris Gorney
*Assistant Examiner* — Griselle C Roland
(74) *Attorney, Agent, or Firm* — Cantor Colburn LLP

(57) ABSTRACT

At least one user table in a relational database management system (RDBMS) using a first operator within a structured query language (SQL) command is identified. The first operator within the SQL command is utilized to transfer one or more data items from the at least one user table to a data array within the RDBMS. The data array is processed within the RDBMS, and one or more output values are generated based on the processing.

20 Claims, 4 Drawing Sheets

(56) References Cited

OTHER PUBLICATIONS

S Stephens, Use Matrix Operations to Transform Spatial Geometries, [online], [retrieved on Jan. 17, 2012], retrieved from the Internet http://articles.techrepublic.com.com/5100-10878_11-5800386.html, 4 pages.

ACM Digital Library, [online]; [retrieved on Jan. 17, 2012]; retrieved from the Internet http://portal.acm.org/citation.cfm?id=1183614.1183687, Ordonez, et al., Vector and Matrix Operations Programmed with UDFs in a Relational DBMS, 2 pages.

* cited by examiner

DATA MANAGEMENT IN RELATIONAL DATABASES

PRIORITY

The present application claims priority to European Patent Application No. 11165740.9, filed on 11 May 2011, and all the benefits accruing therefrom under 35 U.S.C. § 119, the contents of which in its entirety are herein incorporated by reference.

BACKGROUND

The present invention relates generally to the field of computers and computer systems. More particularly, the present invention relates to data handling in relational database management systems (RDBMSs) supporting structured query language (SQL) operators.

Data mining or business analytics algorithms are commonly required to handle large amounts of data stored in RDBMSs. Such algorithms may be used in social network analysis (SNA), data mining clustering, and other applications such as handling outlier detection, and computing Eigen values and vectors representing targeted ("interesting") data mining knowledge such as principal components. The algorithms use matrix or vector mathematical forms which are not easily coded with SQL available in current RDBMSs.

Some limited matrix features exist, including matrix operations implemented either with stored procedures (SP), or user defined functions (UDF), user defined table functions (UDTF), or user defined types (UDT), for instance PIVOT( )/UNPIVOT( ) operators. However, these built-in functions are primarily used to provide reporting capabilities for the RDBMS and are not suited for more generalized matrix operations.

Conventional matrix processing techniques involve extracting data from a RDBMS into a specific application (MATLAB® or R-package for instance) or distributing it in memory over a cluster of machines specifically coded for processing the data in that way: high-performance computing (HPC) clusters or parallel-machine learning (PML) clusters are examples. After processing, the results are stored back in the original RDBMS. This is inefficient as many copies of the data are required, often copied over the network over and over again if whole matrices cannot fit into main memory of the processing device.

Examples of systems in which reporting data is exported from a RDBMS for processing are described in U.S. Pat. No. 6,421,655 and U.S. Pat. No. 7,734,652. The problem of the need to export certain forms of data from an RDBMS to enable processing is described and discussed further in U.S. Pat. No. 7,181,449 (commonly assigned with the present application) which relates to the application of a scalar function across a varying number of records within an RDBMS using the RDBMS's SQL capabilities, that is to say without pre-processing and without copying rows of data to another processor or process.

It has been proposed to manually write SQL statements for specific in-RDBMS matrix operations. However, such SQL statements merely optimize data fetching and rewriting and do not enable the RDBMS engine to optimize the overall set of matrix operations according to the matrix algebra and characteristics of the data (sparse matrices for instance). Even though some matrix operations can be written as two lines of SQL once the formatting of table data has been done in the appropriate manner, it is still a cumbersome design and development phase and not that flexible (e.g., statements have to be rewritten if matrix dimensions change). Some matrix operations are very complicated even when written as standard SQL statements and no standard programmer can support them it when they involve recursion and intricate features. For instance, a basic matrix multiplication may be defined in a short SQL sequence finally, but the sequence to achieve this involves:

1) getting the proper basic raw business information stored in tables (call detail records (CDR)s, customer information, orders, and so forth);
2) formatting the columns and records in a matrix-friendly manner (e.g., column I, column J, value);
3) writing a SQL statement that will allow the matrix operation to occur; and
4) storing the results back into a RDBMS table (re-formatting of columns/records may have to occur again).

As will be understood, in current forms of SQL, it is not always possible to rearrange the business data to match an easier matrix notation. The values may be stored in multiple columns with no indirection (for instance: CDR information). Therefore, creating a generic matrix multiplication for application to this data requires re-formatting of the data to a more matrix-friendly form before applying the SQL, and this is usually not done because it requires expert SQL skills. Crafting SQL statements that can combine multiple matrix operations is even more complicated and is often crafted as a set of multiple independent operations or independent SQL statements, potentially creating more input/output (I/O) operations and increasing latency in the processing.

SUMMARY

According to exemplary embodiments, a method, apparatus, and computer program product for processing data are provided. The method includes identifying at least one user table in a relational database management system (RDBMS) using a first operator within a structured query language (SQL) command. The first operator within the SQL command is utilized to transfer one or more data items from the at least one user table to a data array within the RDBMS. The data array is processed within the RDBMS, and one or more output values are generated based on the processing.

The apparatus for processing data includes a memory configured to store data defining a relational database in a RDBMS and a processor. The processor is configured for identifying at least one user table in the RDBMS using a first operator within a SQL command. The first operator within the SQL command is utilized to transfer one or more data items from the at least one user table to a data array within the RDBMS. The data array is processed within the RDBMS, and one or more output values is generated based on the processing.

A computer program product for processing data according to the method is also provided.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

DETAILED DESCRIPTION

Figure 1:
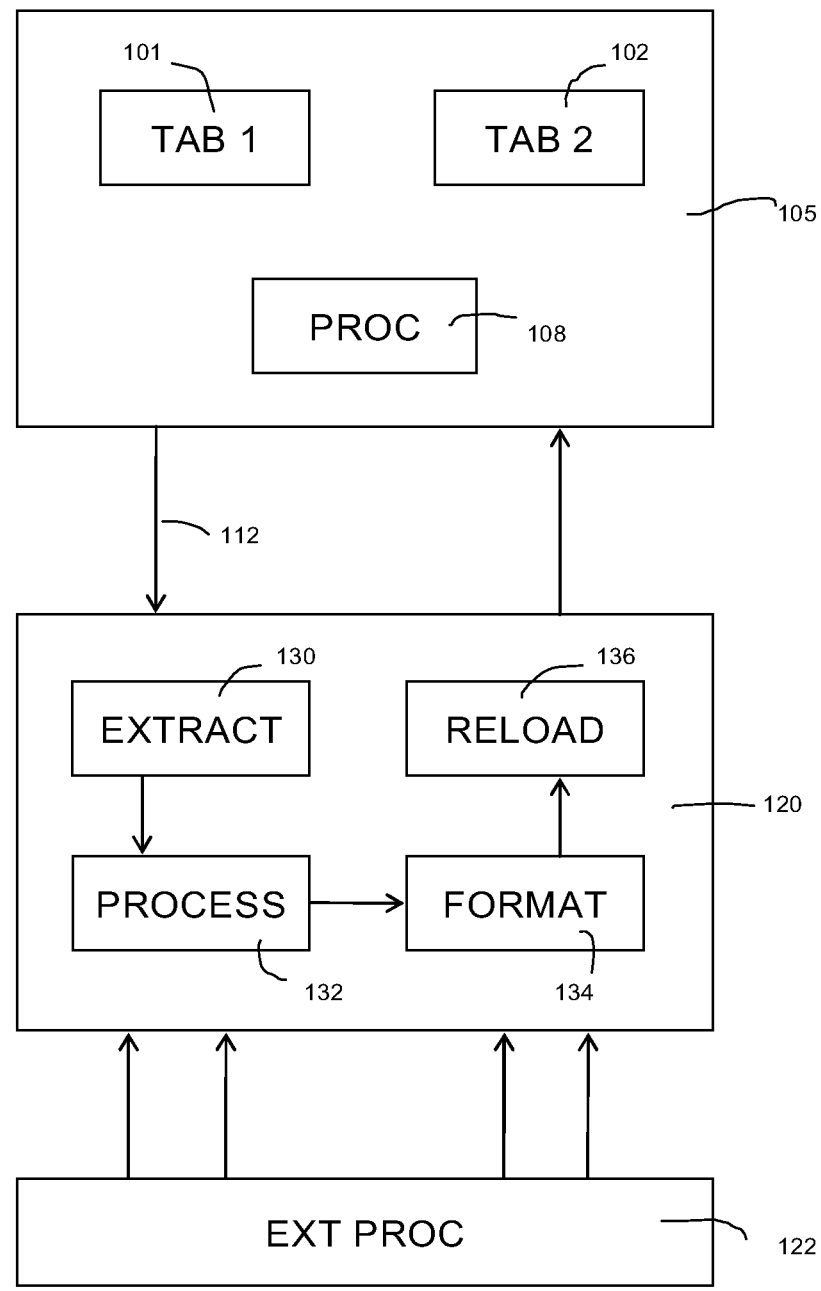
FIG. 1 schematically represents a technique for handling table data from a relational database.

An embodiment of present invention is directed to data handling in relational database management systems (RDBMSs) supporting structured query language (SQL) operators. Embodiments provide a basis for a generic set of new SQL language constructs to provide in-RDBMS (native in-built) matrix and/or vector operators for efficient large dataset processing, thus avoiding the extraction of data to an application/cluster external to the RDBMS. Embodiments further enable the leveraging of existing SQL optimization techniques that minimize input/output (I/O) operations and bandwidth usage.

In accordance with an embodiment there is provided a method of data processing in a RDBMS having SQL capabilities, in which data is stored in the RDBMS in one or more user tables. A first operator within a SQL command is utilized. The first operator identifies at least one of the one or more user tables and which causes the transfer of one or more data items from the at least one user table to a data array within the RDBMS. The data array is processed within the RDBMS and generates one or more output values.

Suitably, the data array is a matrix data representation, and processing the array then includes the application of one or more selected matrix data manipulation functions. The first operator may be instantiated by allowing a SQL naming convention to define mapping of user table column or row data into matrix columns or rows. The resulting MATRIX( ) representation is suitably usable in the FROM clause of a SQL statement. The mapping of the columns of the original tables may be done following the SQL SELECT syntax, allowing the MATRIX( ) operator to be used in place of the currently-used TABLE( ) operator. Columns selected from the table by the MATRIX( ) operator should respectively correspond to the matrix columns following the I, J, value model with the table records matching the matrix records.

In a slight variation, as indicated above, the data array may be a vector data representation, and consequently processing the array would then include the application of one or more selected vector data manipulation functions.

An embodiment may further include, as a precursor to utilization of the first operator, applying a data verification function which, when applied, generates an output indicating whether or not utilization of the first operator will produce an admissible result. In the handling of matrix data, the data verification function, when applied, may combine specific characteristics of the data matrix and, with reference to the data processing due to application of the first operator, may generate an indication as to whether or not the data processing will generate an invalid result.

In an embodiment, determining validity may include comparison of the dimensions of matrices including entries placed therein by the first operator and/or may include the unrolling of polynomial expressions in which data entries placed in a matrix by the first operator are to be entered and processed with minimal I/Os. In an embodiment, the RDBMS compiler and optimizer verify that the matrix operations defined in the SQL SELECT list and TABLE operators are legal. For instance, the verification function may determine that the dimensions of the matrices in the FROM clause matches appropriately for the operation to process successfully. A specific example is described hereinafter in relation to example embodiments.

A method according to an embodiment may include the provision of a further operator, where the further operator is consistent with the format of a SQL aggregator or a SQL predicate. Examples of such further operators include, without limitation: scalar multiplication, matrix addition, matrix subtraction, matrix transposition, matrix inverse, matrix determinant, matrix Eigen Values, and matrix Eigen Vector. More details of such examples are given in the following description of embodiments. Creating one or more aggregation operators and/or predicates to automate some of the basic matrix operations (such as multiplication) to generate the proper matrix optimized operation with proper sequences of I/Os, fetches, modifications and writes, automatically enhances the functionality and contrasts with other approaches where such operations typically require the export of data from the RDBMS and/or the handling by a SQL expert.

In an embodiment, the operators may suitably be configured to provide an output in a form that allows the output to be used as an input to a further operator. In other words, these matrix operators are pluggable so as to allow combined calculation in a single SQL statement, limiting the amount of discrete matrix statements and therefore allowing global optimization of the matrix calculation.

Processing optimization is a useful feature in RDBMS implementations, although the level of optimization may be constrained by the configuration of the background structures or operators providing the data. In an embodiment, optimization is supported by providing for the application of a processing optimization block, where optimization is based on the first operator's form of data to be processed. Thus, while current RDBMS impose certain restrictions on the form (and extent) of optimization permissible, by reference to the transfer to data array first-function, additional optimizations are enabled as a result. For example, where the first operator maps table data to a matrix array, since the matrix array and operations applied to it are specified in the overall computation, the optimizer can look across all the operations and matrices and reorder operations to improve efficiency while minimizing I/O and memory copy operations.

In a method as described above, the first operator may be configured to output one or more values of the predetermined format (such as scalar values). The one or more values are entered into data held within the RDBMS.

An embodiment also provides a data processing apparatus including a processor operable to execute computer program instructions and, as a result thereof, to process data. Memory is arranged to store the computer program instructions and data defining a relational database. A computer program defined in instructions stored in the memory, when executed by the processor, performs a method of data processing as described in greater detail below.

An embodiment further provides a computer program of computer readable program code stored on a computer readable storage medium and loadable into the internal memory of a digital computer, including software code portions. When the program is executed on a computer, it performs the method as described above and in greater detail below.

It is useful for the purposes of comparison to consider how the issues may be addressed using currently known SQL RDBMS engines. As represented by FIG. 1, data for processing is typically held in a plurality of tables 101, 102 within the storage area of a RDBMS 105. For specific built-in data handling tasks, a local processor 108 is provided. Conventional local tasks may include accessing and outputting specific items of data from tables 101, 102 and simple reformatting of data within those tables (for example, converting a table of temperature values from Celsius to Fahrenheit).

As mentioned above, for more complex or computationally intensive processing tasks, the processor 108 associated with the RDBMS 105 typically has insufficient processing capability, or does not have the functional software toolset to handle the tasks required. In such situations, the required data is extracted (as represented by arrow 112 and block 130) from the RDBMS 105 to a suitable storage/staging area which may include for example a cache or dedicated area of RAM 120 attached to an external processor device 122 having the capability to process large volumes of data. Following extraction at 130, the data is processed 132 and re-formatted as necessary 134 before being returned to the RDBMS at 136.

It will be appreciated that, while shown as a single memory 120 and processor 122, the facilities for storing and manipulating data may be distributed across multiple processors with local storage, possibly also with access to remote global storage. Such an arrangement may be particularly useful where the volume of data to be processed (for example the whole contents of Table TAB1) is too great for the single processor 122 to handle within an acceptable time frame, and/or too great for accommodation in local (fast) memory of the processor 122.

Considering a SQL table storing business data, this may be created and populated as follows:
 CREATE TABLE CDR(Key integer, column1 integer, column2 integer)
 CREATE TABLE CDR2(Key integer, column1 integer, column2 integer, column3 integer, column4 integer)
  creation of data for CDR (Matrix A)
  INSERT INTO CDR VALUES(1000, 1,2)
  INSERT INTO CDR VALUES (1000, 3,4)
  INSERT INTO CDR VALUES (1000, 5,6)
  creation of data for CDR2 (matrix B)
  INSERT INTO CDR2 VALUES (2000, 1,2,3,4)
  INSERT INTO CDR2 VALUES (2000, 5,6,7,8)

As a first action, a view is created that would automatically map these tables into a matrix representation for easier processing, in a normalization of representation, as follows:
CREATE OR REPLACE VIEW MATRIX1(MatrixID, I, J, VALUE) AS select key, row_number( ) over(partition by key), 1, column1 from CDR UNION
 select key, row_number( ) over(partition by key), 2, column2 from CDR UNION
 select key, row_number( ) over(partition by key), 1, column1 from CDR2 UNION
 select key, row_number( ) over(partition by key), 2, column2 from CDR2 UNION
 select key, row_number( ) over(partition by key), 3, column3 from CDR2 UNION
 select key, row_number( ) over(partition by key), 4, column4 from CDR2
Note: this view is not necessarily completely optimizable for efficient fetching of records by many low end RDBMS due to the UNION operator and row_number( ) over( ) operators. Some RDBMS do not provide the equivalent of a row_number( ) over( ) operator and therefore this operation alone can be sub-optimal and expensive.

The CDR table is shown in a basic compact matrix formatting. If matrix was a sparse matrix, not all records would be available unless the empty cells are explicitly added in the union.
SELECT * FROM MATRIX1 ORDER BY matrixID,i,j @
This gives the results shown in Table 1 below.

TABLE 1

| MatrixID | I | J | Value |
| --- | --- | --- | --- |
| 1000 | 1 | 1 | 1 |
| 1000 | 1 | 2 | 2 |
| 1000 | 2 | 1 | 3 |
| 1000 | 2 | 2 | 4 |
| 1000 | 3 | 1 | 5 |
| 1000 | 3 | 2 | 6 |
| 2000 | 1 | 1 | 1 |
| 2000 | 1 | 2 | 2 |
| 2000 | 1 | 3 | 3 |
| 2000 | 1 | 4 | 4 |
| 2000 | 2 | 1 | 5 |
| 2000 | 2 | 2 | 6 |
| 2000 | 2 | 3 | 7 |
| 2000 | 2 | 4 | 8 |

The matrix A*B multiplication is calculated (where matrix A is the table CDR with key 1000, and matrix B is based on the table CDR2 with key 2000) by writing the following SQL statement:
SELECT A.i, B.j, sum(A.value*B.value)
 FROM matrix1 as A, matrix1 as B
 WHERE A.j=B.i
 AND A.matrixID=1000 AND B. matrixID=2000
 GROUP BY A.i, B.j
This gives the results shown in Table 2 below:

TABLE 2

| I | J | 3 |
| --- | --- | --- |
| 1 | 1 | 11 |
| 1 | 2 | 14 |
| 1 | 3 | 17 |
| 1 | 4 | 20 |
| 2 | 1 | 23 |
| 2 | 2 | 30 |
| 2 | 3 | 37 |
| 2 | 4 | 44 |
| 3 | 1 | 35 |
| 3 | 2 | 46 |
| 3 | 3 | 57 |
| 3 | 4 | 68 |

Reformatting the result in matrix notation gives the following matrix:

$$\begin{pmatrix} 11 & 14 & 17 & 20 \\ 23 & 30 & 37 & 44 \\ 35 & 46 & 57 & 68 \end{pmatrix}$$

If the matrix format changes (number of columns, number of rows) then all the SQL statements (TABLES, VIEWS) will have to be rewritten but the final multiplication algorithm may not have to be rewritten due to the fact that it has been normalized. The above example highlights a problem with this approach, arising from the fact that this SQL multiplication algorithm is not testing if the matrices are compatible for multiplication. Such a compatibility check would ideally be part of the SQL statement, but RDBMS engines do not allow error checking embedded as part of a SQL statement which effectively blocks the chance of effective optimization. Therefore, if dimension checking is not done, the above SQL statement would give a result that is wrong when the dimension of matrix B is not 2, for instance.

Below is described another way to write the same matrix multiplication process with current RDBMS engines that allows common table expressions. This allows for one single SQL statement to be fully optimized by the SQL engine. It can be more efficient than having the intermediate view in some SQL RDBMS as combining VIEW and UNION operators may be difficult to optimize for limited RDBMS engines. It will be noted that this SQL statement will still execute even if the matrix dimensions do not match, which is of course incorrect. Therefore, an extra consistency check is needed before the statement, but that is not easily done as it requires discovering dynamically how many columns participate in the matrix calculation, and this requires access to the RDBMS catalog (which is proprietary and generally not available to the programmer). With SQL being a declarative language, crafting the whole matrix operations in single SQL statements would allow at SQL compilation time the checking of all the relevant constraints.

```
WITH
    MATRIXA(i,j,value) AS (SELECT row_number( ) over(partition
by key), 1,column1 FROM CDR
    UNION
    SELECT row_number( ) over(partition by key),2,column2
    from CDR),
    MATRIXB(i,j,value) AS (SELECT row_number( ) over(partition
by key), 1,column1 FROM CDR2
    UNION
    SELECT row_number( ) over(partition by key),2,column2 FROM
       CDR2
    UNION
    SELECT row_number( ) over(partition by key),3,column3 FROM
       CDR2
UNION
    SELECT row_number( ) over(partition by key),4,column4 FROM
       CDR2
)
SELECT A.i, B.j, sum(A.value*B.value)
FROM matrixA, matrixB
WHERE A.j=B.i
GROUP BY A.i, B.j
```

In contrast to the foregoing background and current sub-optimal techniques, an embodiment is concerned with reducing the SQL complexity and automating some of these blocks, concealing them from the programmer, by adding new SQL syntax and operators that allow for better development and deployment and for faster optimized matrix operations within the RDBMS engine, suitably in a manner that does not crossing process and processor boundaries.

Figure 2:
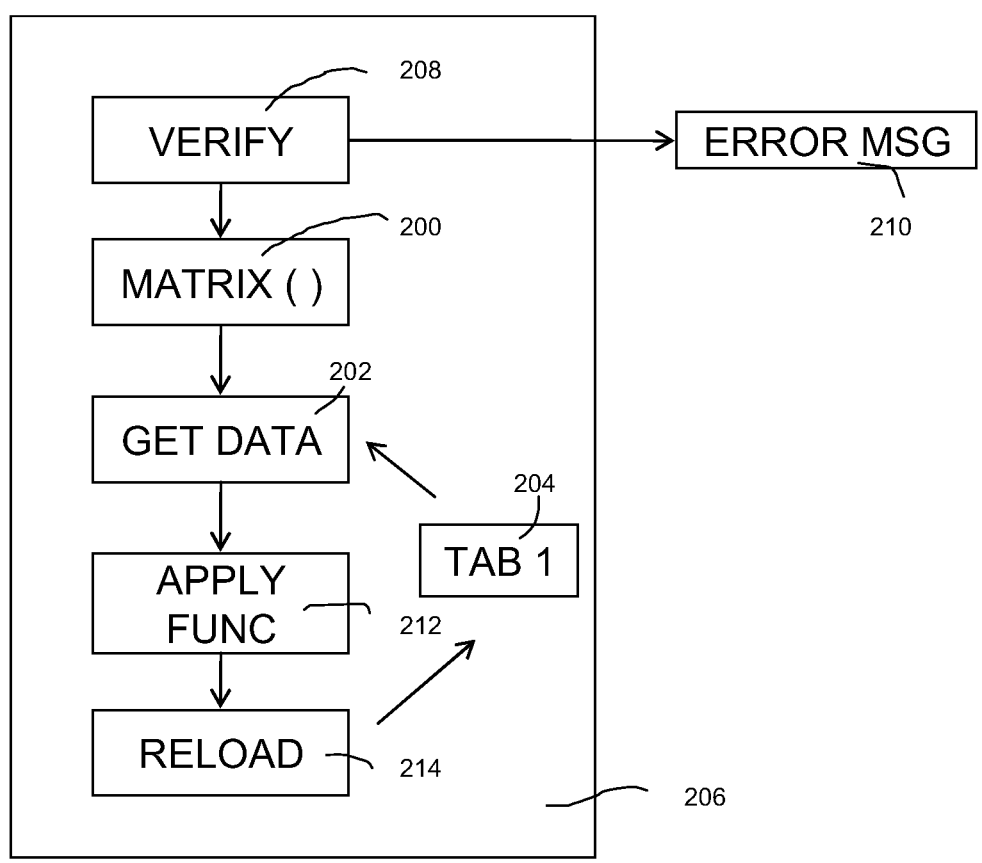
FIG. 2 represents the handling of matrix data using techniques in accordance with an embodiment.

Referring to FIG. 2, an embodiment addresses formatting, by allowing a SQL naming convention to permit an operator at block 200 to get data at block 202 and allocate table columns at block 204 into matrix columns within the RDBMS 206. With the RDBMS SQL parser configured to accept this new language construct, the resulting MATRIX( ) operator is usable in place of the SQL TABLE( ) operator. The mapping of the columns of the original tables is then done following the SQL SELECT syntax. Columns selected at block 202 from the table 204 respectively correspond to the matrix columns following closely the I, J, Value mathematical notation where the table records correspond to the matrix records. It may be considered possible to create these constructs as user defined types (UDTs) or user defined table functions (UDTFs); however, this is not a practicable solution as it would not allow for a global statement optimization.

Figure 3:
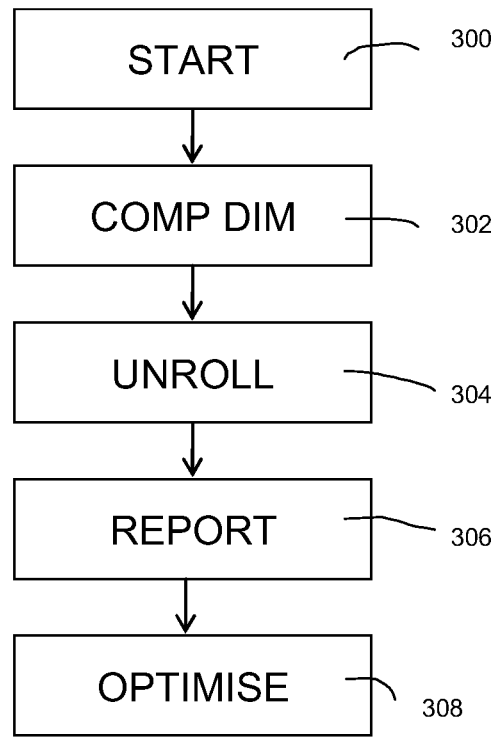
FIG. 3 shows the verification process of FIG. 2 in more detail in accordance with an embodiment.

An embodiment addresses checking. With use of the MATRIX( ) operator, the RDBMS compiler and optimizer are then able to verify at block 208 that the matrix operations defined in the SELECT list and TABLE operators are legal as a precursor to their application, with the generation of an error message at block 210 if the verification fails at compilation time (i.e., early in the development process). The SQL matrix aware engine pre-calculates all the matrix operations per I, J entries (for instance by unrolling all polynomials) and then is able to process the operations for the final matrix as a suite of single arithmetic operations based on data fetching optimization. As shown in more detail in FIG. 3, the verification process starts at block 300 and proceeds to a first check at block 302, for example verifying that the matrix dimensions in the FROM clause are matched for the operation to process successfully. A specific example would be to verify that the number of columns in a matrix A is equal to the number of rows in a further matrix B, or that an invertible matrix can be calculated if it has a non-zero determinant. In addition to (or instead of) comparing matrix dimensions at block 302, the verification process may include further checks at block 304 such as the unrolling of polynomial expressions to be handled. At block 306, an optional reporting block is shown, which may include the generation of an error message (as at block 210 in FIG. 2) if the verification identifies a problem. Once the verification process or processes are concluded, global optimization techniques may be applied at block 308 to minimize fetching of data or maximize caching of common matrix expressions/temporary results.

Referring again to FIG. 2, an embodiment provides built-in matrix operators and predicates to provide functionality applied at block 212 to the extracted table data within the RDBMS. Creating built-in RDBMS SQL aggregation operators and predicates to automate the matrix operations (examples of which are given below) allows for most common matrix operations. When implemented, these operators provide enough information for the SQL optimizer to understand what needs caching (intermediate matrices may be stored in a staging area such as one or more temporary tables in memory). Further optimization is then possible when algebraic operation can be leveraged at the matrix level to minimize internal RDBMS data movements. Once the functional operators have been applied at block 212, the remaining block 214 includes outputting the resulting data (for example, as one or more scalar values) and/or storing the resulting data back in the same table 204 or another user table 204 of the RDBMS.

Example aggregation functions for matrix operations include:
Scalar multiplication: MatrixScalarMult(2, A.*)
Matrix addition: MatrixAdd(A.*, B.*)
Matrix subtraction: MatrixSub(A.*, B.*)
Matrix transposition: MatrixTranspose(A.*)
Matrix inverse: MatrixInvert(A.*)
Matrix determinant: MatrixDet(A.*)
Matrix Eigen Values: MatrixEigen(A.*)
Matrix Eigen Vector: MatrixEigenVect(A.*)

Figure 4:
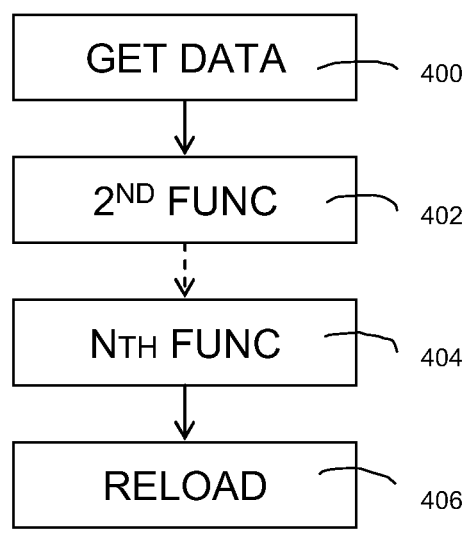
FIG. 4 represents the sequential application of matrix manipulation operators in accordance with an embodiment.

The output of these matrix operators are valid inputs of other matrix operators, making the operators pluggable and satisfying closure requirements when possible. As shown in FIG. 4, following the extraction of data at block 400 as directed by the MATRIX( ) operator, a series of functions and operators at blocks 402 and 404 may be applied before the data is output or reloaded to an RDBMS table at block 406, in like manner to block 214 of FIG. 2. In an embodiment, making the operators pluggable allows combined or pipelined matrix calculations in a single SQL statement as well as consistency checking with dimensionality. This limits the amount of discrete matrix statements to be executed and therefore allows global checking and optimization of the overall matrix calculation.

The following example shows the syntax of a MATRIX built-in multiplication operator in accordance with an embodiment. This contrasts with the above non-optimal examples in that it is the only SQL statement required to create a matrix multiplication from business data (e.g., CDR tables), including doing the checking and performing the calculation.

SELECT matrixmult(A.*, B.*)
   FROM MATRIX (SELECT col1, col2, col3 from CDR) as A,
     columns here are defining a 3×N records matrix
   MATRIX (SELECT col1, col2, col3, col4 FROM CDR2) as B
     columns here are defining a 4×M record matrix This new SQL statement above calculates a new matrix based on an A and B matrix multiplication, with matrix A and matrix B respectively taken from CDR and CDR2 tables with dimensionality between A and B checked at the compilation time of the SQL statement.

It can be seen how this can be extended to more complex matrix calculations directly based on usual SQL tables:

SELECT matrixmult(matrixmult(A.*, B.*), C.*)
   FROM MATRIX (SELECT col1, col2, col3 from CDR) as A,
   MATRIX (SELECT col1, col2, col3, col4 FROM CDR2) as B,
   MATRIX (SELECT col1, col2, col3, col4 FROM CDR3) as C This statement above would result in a matrix resulting from a three matrix multiplication.

By providing for matrix operations within the RDBMS, optimization of matrix operation to minimize data fetching and reduce memory consumption becomes possible. Once a statement has been verified (as described above) and compiled in the RDBMS SQL compiler, the SQL query rewrite engine can then look at the overall statements and chain of matrix operations. Multiple optimization strategies are then possible to minimize data fetch and minimize in-memory footprint for scalability. For example, if changing the order of the matrix operations minimizes the number of I/O operations, then this could be done.

Gains can be achieved if the SQL query rewrite can unroll all the arithmetic operations involved in the whole chain of matrix operations (as at block 304 in FIG. 3), and then order them to minimize I/Os. This can be useful and done properly if the SQL engine has a global view of the operations, which cannot be achieved if these operations are written as UDFs or UDTFs. UDFs and UDTFs are isolated pieces of SQL that are often not in lines together, thus preventing global optimization. If unrolling the arithmetic operations is not possible, the engine could at least decide to cache temporary matrix outputs into temporary tables or materialized views, ordering the records for more efficient processing in the chain of operations.

More techniques can be implemented. For instance, known algorithms exist for optimization when sparse matrices are involved, and the SQL engine may also take this into account. These matrix optimization techniques are different from usual RDBMS table optimizations, but they can leverage usual SQL query rewrite optimization techniques based on cardinality and knowledge of the operators.

Figure 5:
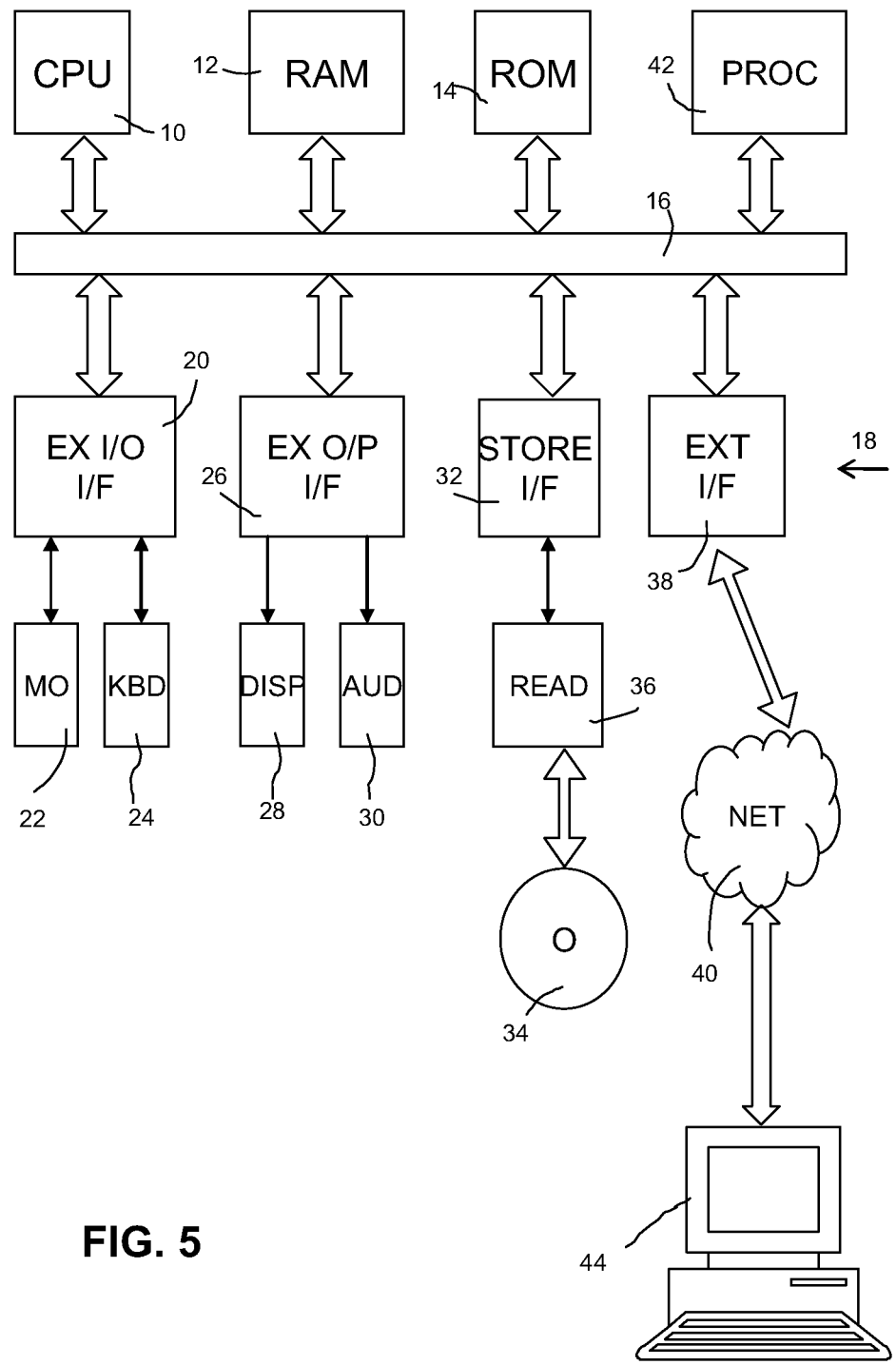
FIG. 5 is a block schematic diagram of the components of a multiprocessor computer system in accordance with an embodiment.

FIG. 5 schematically represents the components of a computer system in accordance with an embodiment. A processor such as, central processing unit (CPU) 10, is coupled with random access memory (RAM) 12 and read only memory (ROM) 14 by an address and data bus 16. Typically, the CPU 10 will handle the application of operators to user table data held in RAM 12, with the CPU and RAM forming the core of the RDBMS. Also connected to CPU 10 via the address and data bus 16 is a further processor 42, which may be a further CPU sharing tasks with the first CPU 10, or may be a co-processor device 42 supplementing the function of the CPU 10, handling processes such as floating-point arithmetic, graphics processing, signal processing and encryption. Each of these internal hardware devices 10, 12, 14, 42 includes a respective interface (not shown) supporting connection to the bus 16. These interfaces are conventional in form and need not be described in further detail.

Also connected to the CPU 10 via bus 16 are a number of external hardware device interface stages (generally denoted as interface stages 18). A first interface stage 20 supports the connection of external input/output devices, such as a mouse 22 and/or keyboard 24. A second interface stage 26 supports the connection of external output devices such as a display screen 28 and/or audio output device 30, such as headphones or speakers. A third interface stage 32 supports the connection to external data storage devices in the form of computer readable storage media: such external storage may as shown be provided by a removable optical or magnetic disc 34 (accessed by a suitably configured disc reader 36). Alternatively or additionally the external storage may be in the form of a solid state memory device such as an extension drive or memory stick. The external storage may contain a computer program, containing program software code portions which, when executed by the CPU 10, direct the operation of the RDBMS and cause the system to perform the method of data processing according to embodiments. A fourth interface stage 38 supports connection of the system to remote devices or systems via wired or wireless networks 40, for example over a local area network LAN or via the internet. A further computer system 44 hosting a publisher and/or subscriber is shown coupled via network 40.

While embodiments have been described above, the technical scope of the invention is not limited to the scope of the above-described embodiments. It should be apparent to those skilled in the art that various changes or improvements can be made to the embodiments. It is apparent from the description of the appended claims that implementations including such changes or improvements are encompassed in the technical scope of the invention.

What is claimed is:

1. A method for processing data, the method comprising:
   identifying at least one user table in a relational database management system (RDBMS) using a first operator within a structured query language (SQL) command;
   applying a data verification function to the first operator, the data verification function generating an output indicating whether or not utilization of the first operator will produce a valid result;
   utilizing the first operator within the SQL command to transfer one or more data items from the at least one user table to a data array within the RDBMS based on the data verification function determining that the first operator will produce a valid result, wherein the data array is a data matrix comprising multiple columns and the data verification function is a mathematical validity check that determines validity by at least: (a) combining specific characteristics of the data matrix and generates an indication as to whether or not processing the data array will generate an invalid result based on a comparison of dimensions of matrices as inputs to be operated upon by the SQL command including entries placed therein by the first operator, and (b) unrolling of polynomial expressions in which data entries placed in the data matrix by the first operator are to be entered as one or more pre-calculated operations prior to processing the first operator;

performing a SQL query rewrite that reduces input/output operations prior to processing the data array within the RDBMS by at least reordering unrolled arithmetic operations involved in a chain of matrix operations, wherein the SQL query rewrite is performed by an SQL engine having a global view of the chain of matrix operations, wherein the matrix operations are not written as user defined functions (UDF);

processing the data array within the RDBMS after performing the SOL query rewrite; and generating one or more output values based on the processing.

2. The method of claim 1, wherein the data array is a matrix data representation, and processing the data array within the RDBMS comprises applying one or more selected matrix data manipulation functions.

3. The method of claim 1, wherein the data array is a vector data representation, and processing the data array within the RDBMS comprises applying one or more selected vector data manipulation functions.

4. The method of claim 1, further comprising provisioning of a further operator consistent with a format of one of a SQL aggregator and a SQL predicate.

5. The method of claim 4, wherein the further operator is operable to perform at least a selected one function from the group comprising:

scalar multiplication, matrix addition, matrix subtraction, matrix transposition, matrix inverse, matrix determinant, matrix Eigen Values, and matrix Eigen Vector.

6. The method of claim 1, wherein each output value is configured to provide an output in a form for use as an input to a further operator.

7. The method of claim 1, further comprising applying a processing optimization based on a form of data to be processed by the first operator.

8. The method of claim 1, wherein the first operator is configured to output one or more values in a predetermined format to be held within the RDBMS.

9. The method of claim 1, wherein the first operator is configured to output one or more scalar values.

10. An apparatus for processing data, the apparatus comprising:

a memory configured to store data defining a relational database in a relational database management system (RDBMS); and a processor, the processor configured for:
identifying at least one user table in the RDBMS using a first operator within a structured query language (SQL) command;
applying a data verification function to the first operator, the data verification function generating an output indicating whether or not utilization of the first operator will produce a valid result;
utilizing the first operator within the SQL command to transfer one or more data items from the at least one user table to a data array within the RDBMS based on the data verification function determining that the first operator will produce a valid result, wherein the data array is a data matrix comprising multiple columns and the data verification function is a mathematical validity check that determines validity by combining specific characteristics of the data matrix and generates an indication as to whether or not processing the data array will generate an invalid result based on a comparison of dimensions of matrices as inputs to be operated upon by the SQL command including entries placed therein by the first operator, and unrolling of polynomial expressions in which data entries placed in the data matrix by the first operator are to be entered as one or more pre-calculated operations prior to processing the first operator;

performing a SQL query rewrite that reduces input/output operations prior to processing the data array within the RDBMS by at least reordering unrolled arithmetic operations involved in a chain of matrix operations, wherein the processor has a global view of the chain of matrix operations, wherein the matrix operations are not written as user defined functions (UDF);

processing the data array within the RDBMS after performing the SQL query rewrite; and generating one or more output values based on the processing.

11. The apparatus of claim 10, wherein the data array is a matrix data representation, and processing the data array within the RDBMS comprises applying one or more selected matrix data manipulation functions.

12. A computer program product for processing data, the computer program product comprising:

a non-transitory computer readable storage medium having computer readable program code embodied therewith, the computer readable program code comprising:
computer readable program code configured for:
identifying at least one user table in a relational database management system (RDBMS) using a first operator within a structured query language (SQL) command;
applying a data verification function to the first operator, the data verification function generating an output indicating whether or not utilization of the first operator will produce a valid result;
utilizing the first operator within the SQL command to transfer one or more data items from the at least one user table to a data array within the RDBMS based on the data verification function determining that the first operator will produce a valid result, wherein the data array is a data matrix comprising multiple columns and the data verification function is a mathematical validity check that determines validity by combining specific characteristics of the data matrix and generates an indication as to whether or not processing the data array will generate an invalid result based on a comparison of dimensions of matrices as inputs to be operated upon by the SQL command including entries placed therein by the first operator, and unrolling of polynomial expressions in which data entries placed in the data matrix by the first operator are to be entered as one or more pre-calculated operations prior to processing the first operator;

performing a SQL query rewrite that reduces input/output operations prior to processing the data array within the RDBMS by at least reordering unrolled arithmetic operations involved in a chain of matrix operations, wherein the SOL query rewrite is to be performed by an SOL engine having a global view of the chain of matrix operation, wherein the matrix operations are not written as user defined functions (UDF);

processing the data array within the RDBMS after performing the SOL query rewrite; and generating one or more output values based on the processing.

13. The computer program product of claim 12, wherein the data array is a matrix data representation, and processing the data array within the RDBMS comprises applying one or more selected matrix data manipulation functions.

14. The computer program product of claim 12, wherein the data array is a vector data representation, and processing the data array within the RDBMS comprises applying one or more selected vector data manipulation functions.

15. The computer program product of claim 12, further comprising computer readable program code configured for provisioning of a further operator consistent with a format of one of a SQL aggregator and a SQL predicate.

16. The computer program product of claim 15, wherein the further operator is operable to perform at least a selected one function from the group comprising:

scalar multiplication, matrix addition, matrix subtraction, matrix transposition, matrix inverse, matrix determinant, matrix Eigen Values, and matrix Eigen Vector.

17. The computer program product of claim 12, wherein each output value is configured to provide an output in a form for use as an input to a further operator.

18. The computer program product of claim 12, further comprising computer readable program code configured for applying a processing optimization based on a form of data to be processed by the first operator.

19. The computer program product of claim 12, wherein the first operator is configured to output one or more values in a predetermined format to be held within the RDBMS.

20. The computer program product of claim 12, wherein the first operator is configured to output one or more scalar values.

* * * * *